United States Patent
Ananthakrishnan et al.

(10) Patent No.: US 9,292,068 B2
(45) Date of Patent: *Mar. 22, 2016

(54) CONTROLLING A TURBO MODE FREQUENCY OF A PROCESSOR

(71) Applicant: Intel Corporation, Santa Clara, CA (US)

(72) Inventors: Avinash N. Ananthakrishnan, Hillsboro, OR (US); Efraim Rotem, Haifa (IL); Doron Rajwan, Rishon Le-Zion (IL); Eliezer Weissmann, Haifa (IL); Ryan Wells, Folsom, CA (US); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/782,539

(22) Filed: Mar. 1, 2013

(65) Prior Publication Data

US 2013/0179705 A1    Jul. 11, 2013

Related U.S. Application Data

(63) Continuation of application No. 13/285,414, filed on Oct. 31, 2011, now Pat. No. 8,943,340.

(51) Int. Cl.
*G06F 13/00* (2006.01)
*G06F 1/32* (2006.01)
(Continued)

(52) U.S. Cl.
CPC .............. *G06F 1/3206* (2013.01); *G06F 1/26* (2013.01); *G06F 1/324* (2013.01); *G06F 1/3243* (2013.01);
(Continued)

(58) Field of Classification Search
CPC ...... G06F 1/26; A01B 12/106; Y02B 60/1217
USPC .................................................. 713/300–344
See application file for complete search history.

(56) References Cited

U.S. PATENT DOCUMENTS

| | | |
|---|---|---|
| 5,163,153 A | 11/1992 | Cole et al. |
| 5,287,292 A | 2/1994 | Kenny et al. |

(Continued)

FOREIGN PATENT DOCUMENTS

| | | |
|---|---|---|
| CN | 101351759 | 1/2009 |
| CN | 101403944 | 4/2009 |

(Continued)

OTHER PUBLICATIONS

Taiwan Patent Office, Office Action Mailed Jun. 24, 2014, In Taiwan Application No. 101135915.

(Continued)

*Primary Examiner* — Tim T Vo
*Assistant Examiner* — Kim T. Huynh
(74) *Attorney, Agent, or Firm* — Trop, Pruner & Hu, P.C.

(57) ABSTRACT

In one embodiment, the present invention includes a multi-core processor with a power controller to control a frequency at which the processor operates. More specifically, the power controller can limit a maximum operating frequency of the processor to less than a configured maximum operating frequency to enable a reduction in a number of frequency transitions occurring responsive to power state events, thus avoiding the overhead of operations performed in handling such transitions. Other embodiments are described and claimed.

18 Claims, 6 Drawing Sheets

(51) Int. Cl.
*G06F 1/26* (2006.01)
*G06F 9/38* (2006.01)

(52) U.S. Cl.
CPC ............ *G06F 1/3287* (2013.01); *G06F 9/3885* (2013.01); *Y02B 60/1217* (2013.01); *Y02B 60/1239* (2013.01); *Y02B 60/1282* (2013.01)

(56) References Cited

U.S. PATENT DOCUMENTS

| | | |
|---|---|---|
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,146,514 B2 | 12/2006 | Kaushik et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,574,321 B2 | 8/2009 | Kernahan et al. |
| 7,596,464 B2 | 9/2009 | Hermerding et al. |
| 7,603,577 B2 | 10/2009 | Yamaji et al. |
| 7,624,215 B2 | 11/2009 | Axford et al. |
| 7,730,340 B2 | 6/2010 | Hu et al. |
| 7,752,467 B2 | 7/2010 | Tokue |
| 8,601,288 B2 | 12/2013 | Brinks et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0030940 A1 | 2/2004 | Espinoza-Ibarra et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0046400 A1* | 3/2005 | Rotem .......................... 323/234 |
| 2005/0132238 A1 | 6/2005 | Nanja |
| 2005/0223258 A1 | 10/2005 | Watts |
| 2005/0288886 A1 | 12/2005 | Therien et al. |
| 2006/0006166 A1 | 1/2006 | Chen et al. |
| 2006/0041766 A1 | 2/2006 | Adachi |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0101174 A1 | 5/2007 | Tsukimori et al. |
| 2007/0106428 A1 | 5/2007 | Omizo et al. |
| 2007/0106827 A1 | 5/2007 | Boatright et al. |
| 2007/0156992 A1 | 7/2007 | Jahagirdar |
| 2007/0168151 A1 | 7/2007 | Kernahan et al. |
| 2007/0214342 A1 | 9/2007 | Newburn |
| 2007/0239398 A1 | 10/2007 | Song et al. |
| 2007/0245163 A1 | 10/2007 | Lu et al. |
| 2007/0260895 A1 | 11/2007 | Aguilar et al. |
| 2008/0028240 A1 | 1/2008 | Arai et al. |
| 2008/0028778 A1 | 2/2008 | Millet |
| 2008/0077282 A1 | 3/2008 | Hartman et al. |
| 2008/0077813 A1 | 3/2008 | Keller et al. |
| 2008/0136397 A1 | 6/2008 | Gunther et al. |
| 2008/0250260 A1 | 10/2008 | Tomita |
| 2008/0307240 A1 | 12/2008 | Dahan et al. |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0235108 A1 | 9/2009 | Gold et al. |
| 2009/0271141 A1 | 10/2009 | Coskun et al. |
| 2009/0271646 A1 | 10/2009 | Talwar et al. |
| 2010/0058078 A1 | 3/2010 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0250856 A1 | 9/2010 | Owen et al. |
| 2011/0093733 A1* | 4/2011 | Kruglick ........................ 713/340 |
| 2011/0154090 A1 | 6/2011 | Dixon et al. |
| 2011/0283124 A1 | 11/2011 | Branover et al. |
| 2012/0053897 A1 | 3/2012 | Naffziger |
| 2012/0066535 A1 | 3/2012 | Naffziger |
| 2012/0096288 A1 | 4/2012 | Bates et al. |
| 2012/0110352 A1 | 5/2012 | Branover et al. |
| 2012/0114010 A1 | 5/2012 | Branch |
| 2012/0116599 A1 | 5/2012 | Arndt et al. |
| 2012/0173907 A1 | 7/2012 | Moses et al. |
| 2013/0246825 A1 | 9/2013 | Shannon |

FOREIGN PATENT DOCUMENTS

| | | |
|---|---|---|
| CN | 101010655 | 5/2010 |
| EP | 1 282 030 A1 | 5/2003 |
| TW | 201040701 | 11/2010 |
| TW | 1342498 | 5/2011 |
| TW | 201120628 | 6/2011 |
| TW | 1344793 | 7/2011 |

OTHER PUBLICATIONS

U.S. Appl. No. 13/282,947, filed Oct. 27, 2011, entitled "Controlling Operating Frequency of a Core Domain Via a Non-Core Domain of a Multi-Domain Processor," by Avinash N. Ananthakrishnan, et al.
U.S. Appl. No. 13/225,677, filed Sep. 6, 2011, entitled "Dynamically Allocating a Power Budget Over Multiple Domains of a Processor," by Avinash N. Ananthakrishnan, et al.
U.S. Appl. No. 13/247,580, filed Sep. 28, 2011, entitled "Controlling Temperature of Multiple Domains of a Multi-Domain Processor," by Avinash N. Ananthakrishnan, et al.
U.S. Appl. No. 13/285,465, filed Oct. 31, 2011, entitled "Dynamically Controlling Cache Size to Maximize Energy Efficiency," by Avinash N. Ananthakrishnan, et al.
U.S. Appl. No. 13/282,896, filed Oct. 27, 2011, entitled "Enabling a Non-Core Domain to Control Memory Bandwidth," by Avinash N. Ananthakrishnan, et al.
Intel Developer Forum, IDF2010, Opher Kahn, et al., "Intel Next Generation Microarchitecture Codename Sandy Bridge: New Processor Innovations," Sep. 13, 2010, 58 pages.
U.S. Appl. No. 12/889,121, "Providing Per Core Voltage and Frequency Control," filed Sep. 23, 2010, by Pakaj Kumar.
SPEC-Power and Performance, Design Overview V1.10, Standard Performance Information Corp., Oct. 21, 2008, 6 pages.
U.S. Appl. No. 13/070,700, "Obtaining Power Profile Information With Low Overhead," filed Mar. 24, 2011, by Robert Knight.
Anoop Iyer, et al., "Power and Performance Evaluation of Globally Asynchronous Locally Synchronous Processors," 2002, pp. 1-11.
Greg Semeraro, et al., "Hiding Synchronization Delays in a Gals Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scaling for a Multiple Clock Domain Microprocessor," 2003, pp. 1-12.

(56) References Cited

OTHER PUBLICATIONS

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

U.S. Appl. No. 14/565,723, filed Dec. 10, 2014, entitled "Controlling a Turbo Mode Frequency of a Processor," by Avinash N. Ananthakrishnan, et al.

U.S. Patent and Trademark Office, Office Action mailed Jul. 31, 2014, in U.S. Appl. No. 13/247,564.

U.S. Patent and Trademark Office, Office Action mailed Jan. 16, 2014, with Reply filed Apr. 9, 2014, in U.S. Appl. No. 13/247,564.

U.S. Patent and Trademark Office, Office Action mailed Jun. 6, 2014, with Reply filed Sep. 4, 2014, in U.S. Appl. No. 13/282,947.

U.S. Patent and Trademark Office, Office Action mailed May 16, 2014, with Reply filed Aug. 12, 2014, in U.S. Application No. 13/285,414.

U.S. Patent and Trademark Office, Final Office Action mailed May 14, 2014, with Request for Continued Examination filed Aug. 13, 2014, in U.S. Appl. No. 13/247,580.

U.S. Patent and Trademark Office, Office Action mailed Aug. 18, 2014, in U.S. Appl. No. 13/285,465.

* cited by examiner

US 9,292,068 B2

CONTROLLING A TURBO MODE FREQUENCY OF A PROCESSOR

This application is a continuation of U.S. patent application Ser. No. 13/285,414, filed Oct. 31, 2011, the content of which is hereby incorporated by reference.

BACKGROUND

Many current processors have multiple cores that operate at a common voltage and frequency domain. The peak current draw that the processor can actually consume is a function of the workload running on each core and the number of active cores. Depending on the number of active cores, the peak frequency at which the processor can run changes. The fewer the number of active cores, the higher the frequency at which the processor can run. Workloads that turn on and off cores (or utilize varying numbers of cores) at a high rate can cause the processor to change frequency at that rate.

When a processor performs a frequency transition to accommodate frequency changes, energy efficiency and performance can be impacted, as such transitions incur an idle down time penalty. Suitable mechanisms to avoid this penalty do not presently exist.

DETAILED DESCRIPTION

Figure 1:
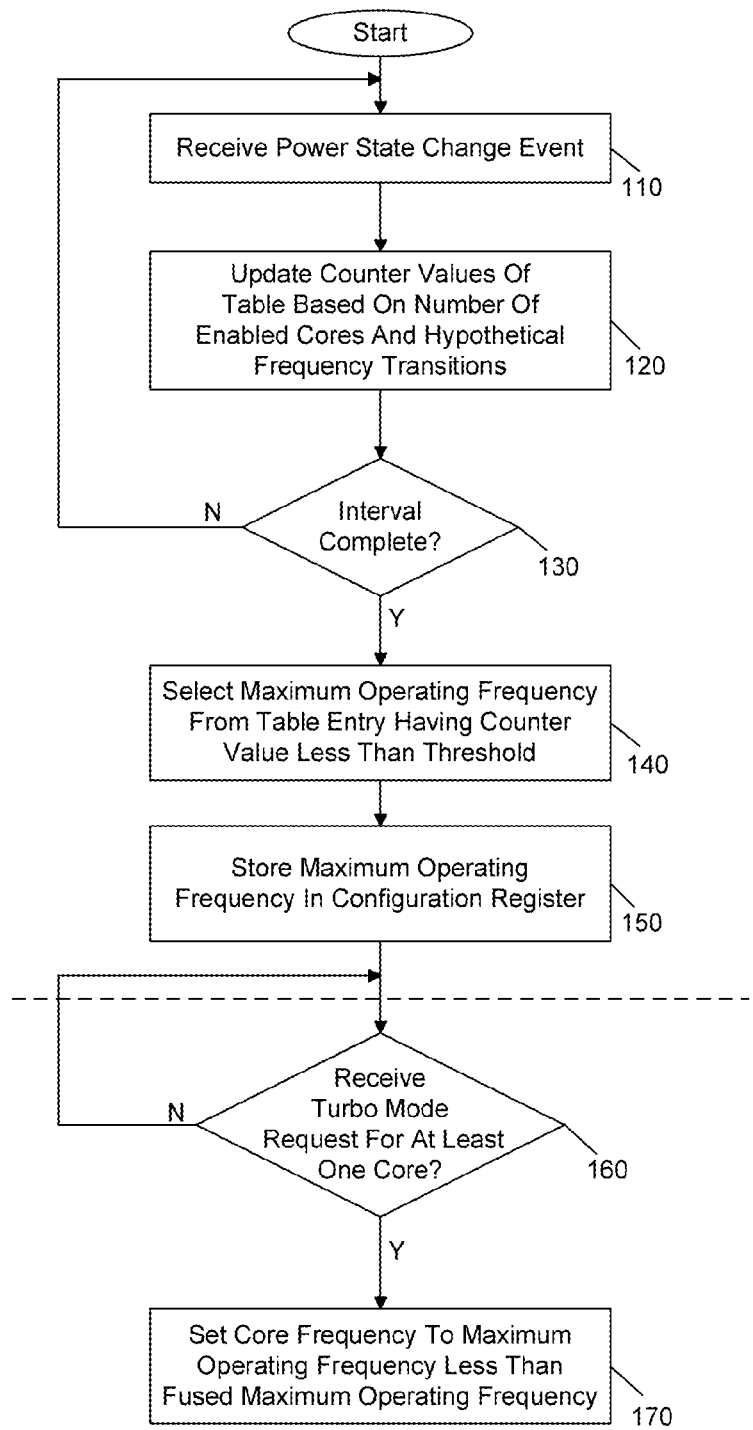
FIG. 1 is a flow diagram of a method in accordance with an embodiment of the present invention.

Embodiments provide a turbo demotion mechanism to maximize performance and energy efficiency on workloads that cause a large number of core wake events and use a varying number of cores over runtime duration. Embodiments may be particularly suitable for a multicore processor in which multiple cores share a single voltage and frequency domain, or a multicore processor including cores in independent domains. As used herein the term "domain" is used to mean a collection of hardware and/or logic that operates at the same voltage and frequency point. As an example, a multicore processor can further include other non-core processing engines such as fixed function units, graphics engines, and so forth. Such processor can include at least two independent domains, one associated with the cores (referred to herein as a core domain) and one associated with a graphics engine (referred to herein as a graphics domain). Although many implementations of a multi-domain processor can be formed on a single semiconductor die, other implementations can be realized by a multi-chip package in which different domains can be present on different semiconductor die of a single package. Embodiments apply equally to other processor designs such as a multicore processor including a plurality of cores formed on a single semiconductor die and operating within a single domain.

According to an operating system (OS)-based mechanism, namely the Advanced Configuration and Platform Interface (ACPI) standard (e.g., Rev. 3.0b, published Oct. 10, 2006), a processor can operate at various power and performance states or levels. With regard to power states, ACPI specifies different power consumption states, generally referred to as so-called C1 to Cn states. When a core is active, it runs at a so-called C0 state, and when the core is idle it may be placed in a core low power state, a so-called core non-zero C-state (e.g., C1-C6 states). When all cores of a multicore processor are in a core low power state, the processor can be placed in a package low power state, such as a package C6 low power state. In addition to these power states, a processor can further be configured to operate at one of multiple performance states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above this P1 frequency. The highest such frequency may correspond to a maximum turbo frequency (P0), which is a highest frequency at which a domain can operate. This maximum turbo frequency thus is the highest end of multiple bin frequencies greater than the P1 frequency and corresponds to a maximum non-guaranteed highest performance level that can be achieved. Note that at this frequency there are no guarantees on whether the domain exceeds the power or thermal specifications of the processor. In many situations, device characterization during fabrication of a processor can be used to set a maximum turbo frequency, which can be set on a per domain basis. Bin frequencies up to the maximum turbo frequency can be stored in a non-volatile storage or other mechanism of a processor. Note that it is not guaranteed that a processor with more than one domain is able to simultaneously run all domains at their respective maximum turbo frequencies. It is also not guaranteed that a given domain can run at its maximum turbo frequency while other domains are running at their respective guaranteed frequencies.

That is, platform power and current delivery constrain the maximum turbo frequency at which a processor can run as a function of the number of cores in a C0 state. The fewer the number of cores in the C0 state, the higher the maximum turbo frequency at which the active cores can run. Note that running the cores at the highest turbo frequency that can be electrically sustained is not always optimal as this could potentially incur additional frequency transitions as additional cores go in and out of the C0 state. Since each frequency transition causes all the cores to be halted for a certain idle duration, this could lead to burning more power when no execution is being done by the cores. However, running the cores slower than the maximum electrically sustainable turbo frequency point will likely incur fewer frequency transitions but would also be at a lower frequency point than otherwise possible, thus leaving performance headroom available.

Embodiments determine the highest frequency at which the processor can be run, while at the same time minimizing the number of frequency transitions to provide the best overall performance and energy efficiency. This balancing or tradeoff realized by embodiments of the present invention is thus in contrast to the conventional manner of always operating a processor at the highest frequency at which it can run for a given number of active cores. Embodiments thus provide a dynamic means for tracking the average number of cores utilized over configurable time intervals of the workload and controlling the processor to operate at the optimal frequency that trades off peak frequency at which the processor can run with minimizing the number of frequency transitions, resulting in overall higher net performance and better energy efficiency.

Relevant to the present discussion, a power controller of a processor such as a power control unit (PCU) is responsible for aggregating core wake up or sleep requests and prescribing an operating voltage and frequency point for a domain. The PCU handles a core wake up or sleep event in the following manner, in one embodiment. When a workload seeks to place a core to sleep (e.g., to a C6 state), it issues a low power request, e.g., via issuance of a MWAIT instruction on the core, which causes the PCU to enable the core to enter into a given low power state. The core can be woken out of this low power state via an interrupt, either from a timer, from another core or from an external device. These sleep or wake up requests are forwarded to the PCU. As examples, every time a core seeks entry into a C6 state or exit into a C0 state, a notification is sent to the PCU. From its knowledge of the states of the various cores, the PCU calculates the number of active cores (e.g., the cores in the C0 state) and estimates the peak current draw that is possible for the number of active cores.

The PCU then compares this estimated peak current draw with the peak current that can be sourced by the platform power delivery network and prescribes an operating frequency such that the estimated peak current draw for the given number of active cores is lower than what the platform can sustain. As a result, for fewer numbers of active cores the processor can be run at a higher frequency. Typically in a system where there are N cores, there are N frequency points limiting how fast the processor can be run for 1-to-N number of cores in an active power state. These distinct frequency points are known as 1-core turbo frequency . . . N-core turbo frequency, depending on how many cores are active. Thus the N-core to 1-core turbo frequencies are operating frequencies above a guaranteed operating frequency, and can extend from at least a bin frequency above the guaranteed operating frequency of P0 (which can be referred to as a P0N frequency), e.g., for an N-core turbo frequency, to a maximum fused single core turbo frequency (which can be referred to as a P01 frequency, which can map to an ACPI P0 P-state), e.g., for a 1-core turbo frequency. Note that the term "N-core turbo frequency" is used to describe a turbo frequency when N cores are in an active state. An N-core turbo frequency can electrically sustain a case where 1 to N cores are active in the C0 state.

In general, embodiments may use a turbo demotion algorithm to limit the number of frequency changes to be effected when changes in the number of active processor cores occur. To effect this operation, the PCU is notified of a power state change event, and at every such event the PCU calculates the number of cores in an active (e.g., C0) state after the event. To determine the appropriate frequency, embodiments may maintain a table of hypothetical or potential number of frequency transitions to be performed for a series of power state events. The table can include a plurality of entries, where each entry of the table corresponds to an N-core turbo frequency. In addition, each of these entries can include a counter field to store a count of the number of possible frequency transitions that would occur if the processor were operating at this N-core turbo frequency when a power state event occurs during an evaluation interval. Thus, the counter field of the table entries can be updated, e.g., incremented by one, for each power state event during an evaluation interval in which a frequency transition would occur as a result of the change in a number of active processors if the processor were operating at a given N-core turbo frequency.

This table can be maintained and updated for all power state events during an evaluation interval. At the conclusion of the interval, the table can be analyzed, e.g., by the PCU, to determine an appropriate maximum N-core turbo frequency at which the processor is to operate during the next time interval. At this point, the counter field of the entries of the table can be reset or cleared, and a new evaluation interval can begin.

In one embodiment, to determine the appropriate N-core turbo frequency at which the processor is to operate for a next interval, a top down search of the table entries can be made to find the first entry having a counter field that is lower than a threshold value, namely a frequency transition threshold. This threshold value thus may correspond to a number of frequency transitions that are to be permitted during an operating interval. In this way, the costs incurred in performing a frequency transition, which can include flushing cores of pending operations, placing the cores in a sleep state and taking actions to change the frequency, can be reduced.

In one embodiment, the table can be updated as follows: assume the number of cores in the C0-state (after the power state change event) is 3, and the total number of cores in the processor is 4, and further assume there was only 1 core in the C0-state before the power state change event. If the processor was previously operating at a 1-core turbo frequency or a 2-core turbo frequency, the PCU would have to do a frequency transition and drop the frequency down to, at most, a 3-core turbo frequency to support 3 active cores in the C0-state. Thus for this example of operation, the table entries for both the 1-core turbo frequency and 2-core turbo frequency can be updated, e.g., incremented by 1. In another embodiment if the cost to do a frequency transition varies with the number of cores already active in the C0 state, the table entries corresponding to 1-core turbo and 2-core turbo frequencies can be incremented by a value proportional to the transition cost. In contrast, the table entries for both the 3-core turbo frequency and 4-core turbo frequency would not be updated, as there would be no frequency transition needed to handle an active state for 3 cores.

Assume in another case if there were 2 cores active prior to the C-state event and the processor was operating at the 2-core turbo frequency, the PCU would have had to perform a frequency transition, e.g., drop the frequency to at maximum the 3-core turbo frequency, to support 3 cores in the C0-state. Again the table entries for both the 1-core turbo frequency and 2-core turbo frequency can be updated. If instead there were 3 cores active prior to the C-state event, no frequency transition would have been necessary to handle the C-state event, and thus the same updates as above would occur. Finally, if there were 4 cores active prior to the C-state event, the platform can support 3 cores in the C0 state, this would mean the processor is running at a lower frequency than the maximum frequency at which it could be operating. But the table updates would be the same as above.

The entries of the table thus essentially count the hypothetical or potential number of frequency transitions that the PCU would have to do to support a C-state event as a function of the processor running at each of the N-core turbo frequencies prior to the C-state event. In an embodiment, the table can be configured such that the counter values of the entries are in a decreasing order going from the 1-core turbo frequency (highest turbo frequency) to N-core turbo frequency (lowest turbo frequency). Of course, different conventions and counting mechanisms are possible in other embodiments such that counts and ordering can be different.

Thus at every C-state event the PCU updates the table based on the number of cores in the C0 state after the C-state event. To operate at the most energy efficient and performance efficient point, the processor may be controlled to run at the highest frequency possible while at the same time minimizing the number of frequency transitions.

To realize this control of processor operating frequency, the PCU can be configured with certain parameters. Namely, a time window can be defined to correspond to the duration of time over which the PCU monitors the table and determines the maximum frequency to limit the processor to over the subsequent time window. The table values at a conclusion of a first time window can be used to determine maximum operating frequency of the processor for a second time window immediately following the first time window. In turn, a second parameter, namely a frequency transition threshold, can be used to define the desired maximum number of frequency transitions over the specified time window. Although the scope of the present invention is not limited in this regard, note that both the time window and the frequency transition threshold are tunable parameters and can be set on a per processor basis based on the workloads the processor targets and the number of cores in the processor. In some embodiments, these parameters can be stored in a non-volatile memory associated with the PCU.

Once the evaluation time window expires, the PCU accesses the turbo demotion table and performs, e.g., a top down search to determine the highest turbo frequency at which the processor can operate during the next evaluation time window where the estimated number of frequency transitions is lower than the specified frequency transition threshold. The PCU applies this turbo frequency as the peak frequency to run at over the next evaluation time window. Accordingly, incoming requests for turbo mode from the OS or other scheduling mechanism during the next time window are limited to the identified turbo frequency. At this point, the table is reset and the above process can be repeated over every evaluation time window.

Referring now to FIG. 1, shown is a flow diagram of a method in accordance with an embodiment of the present invention. As shown in FIG. 1, method 100 can be performed by logic, e.g., of a PCU. This logic can be configured to receive and handle power state change requests from various cores of the processor. In addition, this logic can further leverage information of the request, along with the number of cores in an active power state after the request is performed to determine whether a hypothetical frequency transition would occur for each of N-core turbo frequencies. As will be seen, this determination can be used to update a turbo demotion table.

This method 100 can begin by receiving an incoming power state change event (block 110). For example, responsive to an interrupt or other reason, a core in a low power state can request to be returned to an active power state, or a core in an active state can request to be placed into a low power state. Responsive to receipt of such request, the logic can set into motion the operations to be performed to cause the power state change to the given core.

In addition as seen in FIG. 1, at block 120 a table, namely a turbo demotion table, can be updated. More specifically, counter values of this table can be updated based on the number of enabled processor cores after the power state change event and the hypothetical number of frequency transitions. That is, as described above for each entry associated with one of N-core turbo frequencies, the logic can determine whether if the processor were operating at that core-turbo frequency, a frequency transition would be needed in order to accommodate the updated number of active cores. The updates made to each entry may be by incrementing the value of a counter field of the entry by one if a frequency transition would be needed and otherwise not updating the entry. Note that the increment only occurs if a frequency transition by way of frequency reduction to accommodate a greater number of active cores would occur. If instead a fewer number of cores are enabled after the power state change event, no update to the table occurs, as no frequency transition would be required to remain within power and/or thermal specifications.

Still referring to FIG. 1, next it can be determined whether an interval has completed (diamond 130). This interval, corresponding to an evaluation interval, may be on the order of between approximately 10 and 50 milliseconds (ms). If the interval is not completed, control passes back to block 110 discussed above.

Otherwise, control passes to block 140 where the selected maximum operating frequency for the processor can be obtained from the table. More specifically, a maximum operating frequency for the processor for the next interval can be set to be the highest N-core turbo frequency having an associated entry with a counter value less than a threshold. As an example, assume a threshold of 50, meaning that the processor is configured to perform no more than 50 frequency transitions during an operating interval. Accordingly, an entry of the table having a counter field value less than 50 may be selected. Where multiple such entries are present, the entry associated with the highest N-core turbo frequency can be selected. Next, control passes to block 150 where this maximum operating frequency can be stored in a configuration register. Note that this configuration register, which may be present in the PCU, thus acts as an override of a configured maximum frequency for the processor, e.g., a fused P0 frequency. In various embodiments, note that all N-core tubo frequencies can be fused within the processor, e.g., based on characterization testing of the processor.

These operations discussed with regard to FIG. 1 are thus performed during each evaluation interval to obtain and set a maximum operating frequency for a next operating interval. In various embodiments, the length of the evaluation interval and the operating interval can be co-extensive.

Based on this maximum operating frequency, the PCU can control the operating frequency of the processor accordingly during the next operating interval, shown further in FIG. 1. Specifically, during this next operating interval, at diamond 160 it can be determined whether the PCU has received a turbo mode request for at least one core of the processor. If so, control passes to block 170 where the PCU can set this core frequency (assuming independent core domains) to be the maximum operating frequency which, as discussed above can be lower than a fused maximum operating frequency of the processor. Thus although a workload is not executing at the fused maximum operating frequency, performance may still improve as the overhead associated with greater numbers of frequency transitions can be avoided, possibly improving workload performance. Although described with this particular implementation in the embodiment of FIG. 1, understand the scope of the present invention is not limited in this regard.

Figure 2:
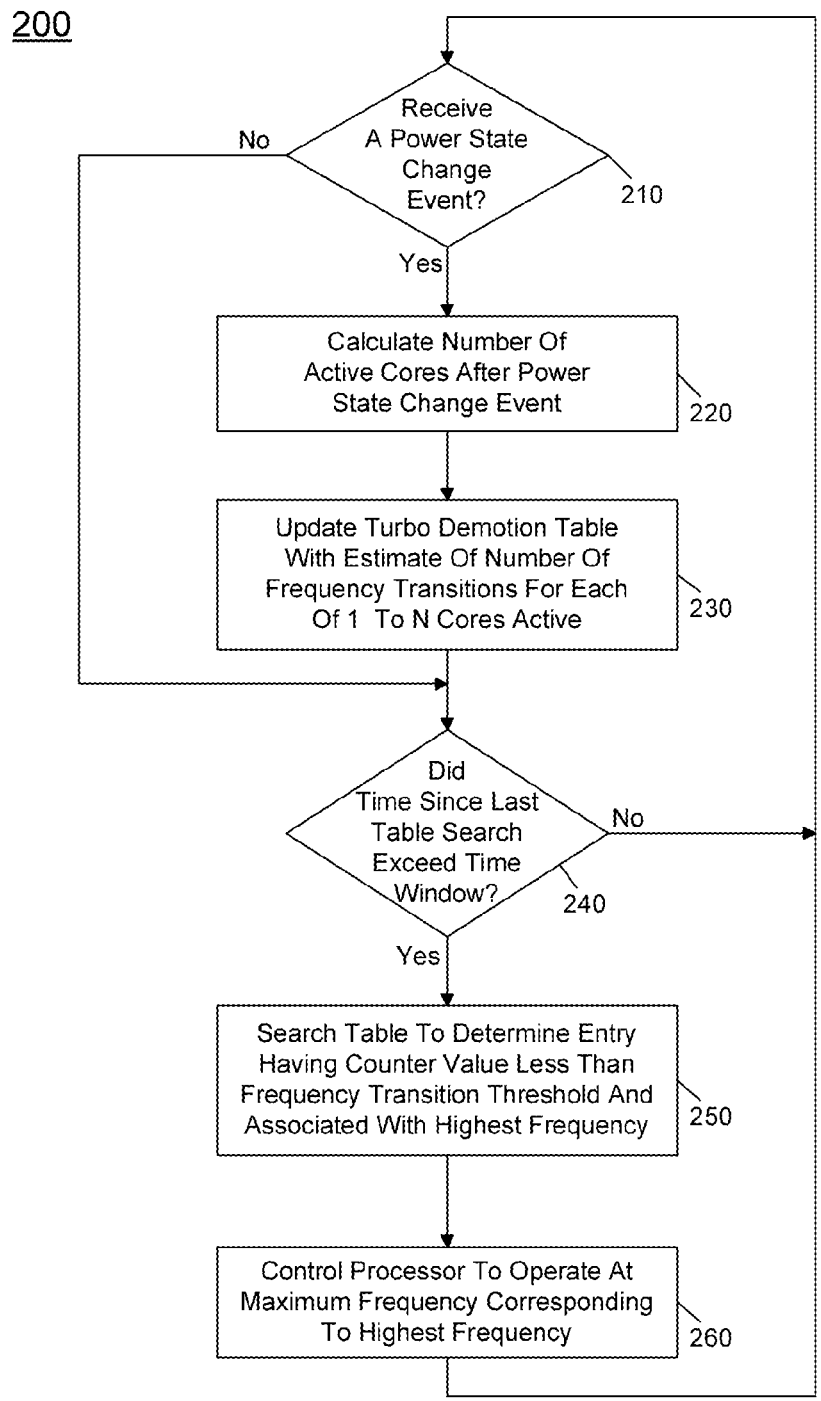
FIG. 2 is a flow diagram of a method of updating a turbo demotion table in accordance with an embodiment of the present invention.

Referring now to FIG. 2, shown is a flow diagram of further details of a method of updating a turbo demotion table and determining a maximum operating frequency in accordance with an embodiment of the present invention. Method 200, which can similarly be performed by PCU logic, begins by determining whether a power state change event has been received (diamond 210). If so, control passes to block 220, where the number of active cores after the event can be calculated. Next control passes to block 230 where the turbo demotion table can be updated with an estimate of the number of frequency transitions for the entries associated with the different N-core turbo frequencies. Such updates may be as discussed above.

From both diamond 210 if no power state change event has been received and from block 230, control passes to diamond 240 where it can be determined whether the time since the last table search to determine an appropriate frequency has exceeded a time window, e.g., corresponding to the evaluation interval. If so, control passes to block 250 where the table can be searched to determine the entry associated with the highest N-core turbo frequency and having a counter value less than a frequency transition threshold. Thus where there are multiple entries in the table having counter values less than this threshold, the entry associated with the highest N-core turbo frequency can be selected. Note that in various implementations, the table entry corresponding to the N-core turbo frequency, where N is the number of cores supported in the processor, may hold a value of 0. This is because if the N-core turbo frequency can sustain the maximum number of active cores in the processor, it can sustain any number of active cores equal to or less than this maximum. Control then passes to block 260 where during the next operating interval, the processor can be controlled to operate at a maximum operating frequency corresponding to this N-core turbo frequency. Although shown with this particular implementation in the embodiment of FIG. 2, understand the scope of the present invention is not limited in this regard.

Figure 3:
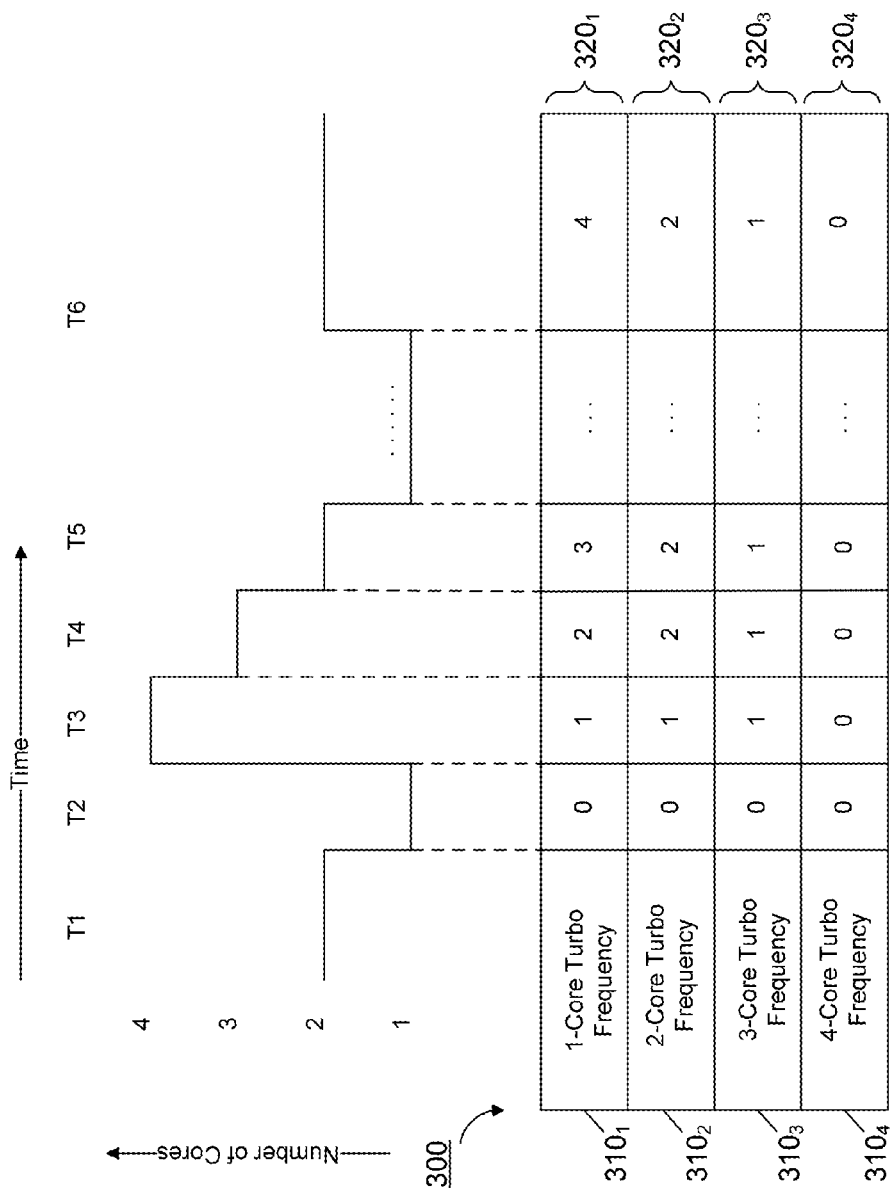
FIG. 3 is a graphical illustration of a number of enabled cores over time and a turbo demotion table in accordance with an embodiment of the present invention.

To further illustrate how updates to a table in accordance with an embodiment of the present invention can be performed, reference is made to FIG. 3. In FIG. 3, a graphical illustration of a number of enabled cores over time is shown, along with entries of a table and their corresponding updates. Specifically, in the embodiment of FIG. 3 assume a 4-core processor is present. As seen, over time a varying number of cores are enabled for an active (e.g., C0) state. In turn, a table 300 is present including a plurality of entries $310_1$-$310_4$. Each table entry 310 is associated with a corresponding N-core turbo frequency. In addition, each entry can include a counter field. As seen at an initial time T1 at a beginning of an evaluation interval, the counter field $320_1$-$320_4$ of each of the entries can be set at zero. Then over the time instants T2-T6, given entries can be updated if upon a power state change event, a frequency transition for the corresponding N-core turbo frequency would be required. As seen, the 1-core turbo frequency, which is the highest turbo frequency (which may correspond to a fused P0 maximum turbo frequency), would require the greatest number of frequency transitions. In contrast, at the 4-core turbo frequency, which may be a lowest of the possible turbo frequencies, the processor would not require any frequency transitions. Embodiments may leverage this information to select a turbo frequency for an operating interval that is below a threshold value. Understand that while shown at this high level in the embodiment of FIG. 3 and for a small number of power state transition events, the scope if the present invention is not limited in this regard.

Figure 4:
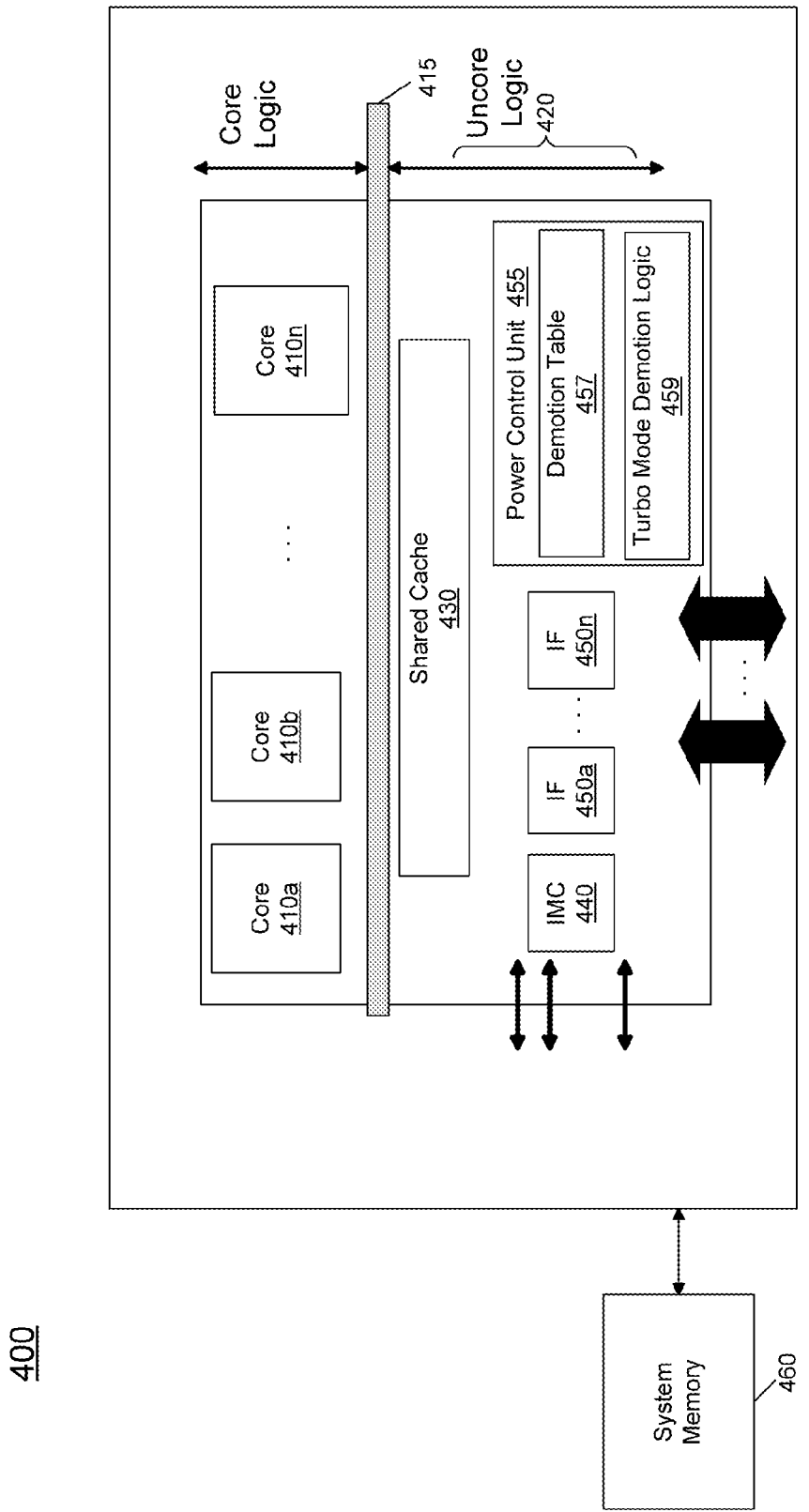
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be of an independent power domain and can be configured to operate at an independent voltage and/or frequency, and to enter turbo mode when available headroom exists. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a turbo mode demotion logic 459, which may be a logic to analyze potential frequency transitions during an evaluation interval and constrain a maximum operating frequency to reduce the number of frequency transitions to occur responsive to varying numbers of active cores. To this end, logic 459 can be coupled to a demotion table 457, which can include entries to be updated by the logic as discussed above.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
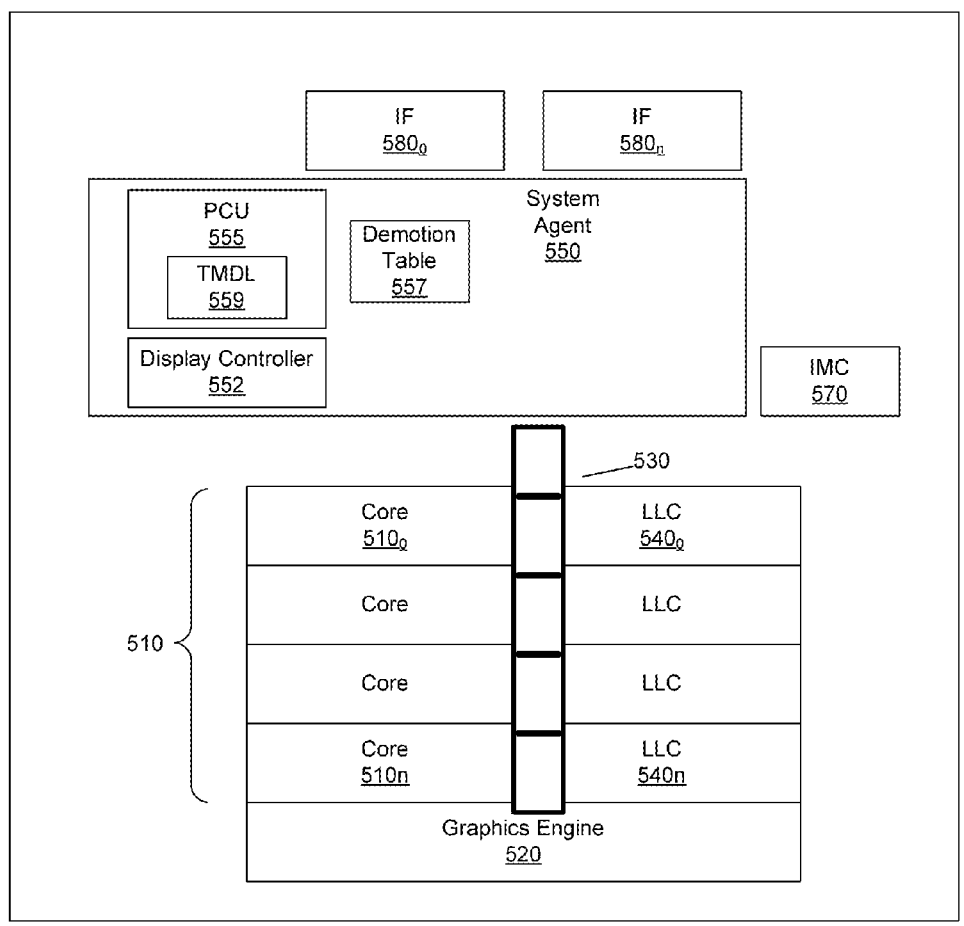
FIG. 5 is a block diagram of a processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510n$, a graphics domain 520 can include one or more graphics engines, and a system agent domain 550 may further be present. In various embodiments, system agent domain 550 may execute at a fixed frequency and may remain powered on at all times to handle power control events and power management such that domains 510 and 520 can be controlled to dynamically enter into and exit low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a LLC $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a turbo mode demotion 559 in accordance with an embodiment of the present invention to limit a maximum operating frequency of the cores based on hypothetical frequency transition count information stored in demotion table 557. In various embodiments, this logic may execute the algorithms described above in FIGS. 1 and 2.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
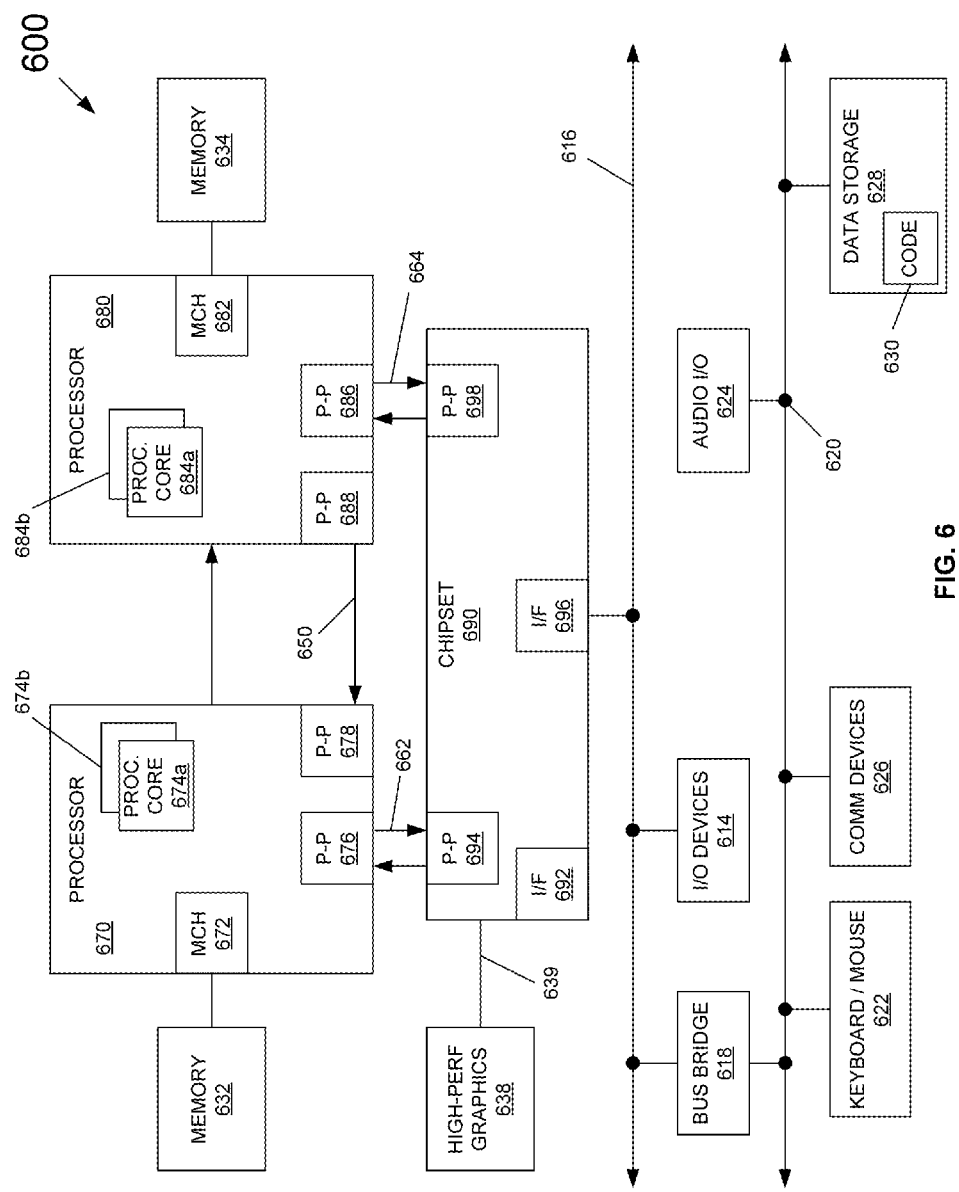
FIG. 6 is a block diagram of a system in accordance with one embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform dynamic control of a maximum operating frequency to reduce frequency transition events, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, ultrabook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a non-transitory machine-accessible storage medium including instructions that when executed cause a system to:
    analyze a plurality of power state change events of a multicore processor including a plurality of cores during an evaluation interval to determine a number of frequency transitions responsive to the plurality of power state change events for each of N-core turbo frequencies;
    select one of the N-core turbo frequencies to be a maximum operating frequency of the multicore processor for a next operating interval based at least in part on the number of frequency transitions, the selected N-core turbo frequency less than a configured maximum operating frequency of the multicore processor; and
    control the plurality of cores to operate at no higher than the selected N-core turbo frequency for the next operating interval.

2. The article of claim 1, further comprising instructions that when executed enable the system to receive a turbo mode request for a first core of the multicore processor from a scheduler during the next operating interval, and control the first core to operate at the selected N-core turbo frequency.

3. The article of claim 1, further comprising instructions that when executed enable the system to update a first entry of a table on a power state change event, if a frequency transition would be performed responsive to the power state change event if the multicore processor were operating at an N-core turbo frequency associated with the first entry.

4. The article of claim 3, further comprising instructions that when executed enable the system to select the maximum operating frequency based on the table and store the maximum operating frequency in a configuration register of the multicore processor.

5. The article of claim 4, wherein the selection of the maximum operating frequency comprises selection of the maximum operating frequency to be the N-core turbo frequency associated with an entry of the table having a counter value less than a threshold.

6. The article of claim 3, further comprising instructions that when executed enable the system to update the first entry of the table associated with the N-core turbo frequency when a number of the plurality of cores in an active state after the power state transition event is greater than N.

7. The article of claim 6, wherein update of the first entry includes incrementation of the first entry.

8. The article of claim 3, further comprising instructions that when executed enable the system to not update a second entry of the table associated with an N+1-core turbo frequency when a number of the plurality of cores in an active state after the power state change event is less than or equal to N+1.

9. The article of claim 3, further comprising instructions that when executed enable the system to update a plurality of entries of the table responsive to the power state change event when a frequency transition would be performed responsive to the power state change event if the multicore processor were operating at the N-core turbo frequency associated with each of the plurality of entries prior to the power state change event.

10. A processor comprising:
a plurality of cores to independently execute instructions; and
a power controller to control a frequency at which the processor is to operate, the power controller to limit a maximum operating frequency of the processor to less than a configured maximum operating frequency to enable a reduction in a number of frequency transitions that occur responsive to power state events, wherein the power controller is coupled to a table including a plurality of entries each associated with an N-core turbo frequency and to store a counter value corresponding to a first number of frequency transitions during an evaluation interval if the processor were to operate at the N-core turbo frequency, and analyze a plurality of power state change events during the evaluation interval to determine the first number of frequency transitions.

11. The processor of claim 10, wherein the power controller is to limit the maximum operating frequency to be an N-core turbo frequency associated with an entry of the table having a counter value less than a threshold.

12. The processor of claim 11, wherein when a plurality of entries have a counter value less than the threshold, the power controller is to select the highest N-core turbo frequency associated with the plurality of entries.

13. The processor of claim 11, wherein the power controller is to receive a turbo mode request from a scheduler and to cause the processor to operate at the N-core turbo frequency.

14. The processor of claim 10, wherein responsive to the maximum operating frequency limit, when N cores of the processor are in an active state, the processor is to operate at no higher than an N+1-core turbo frequency during a turbo mode.

15. A system comprising:
a multicore processor including a plurality of cores and a controller to, responsive to a power state change event of at least one core of the plurality of cores, determine a number of cores of the multicore processor to be in an active state after the power state change event, and determine whether to update a first entry of a turbo demotion table associated with a N-core turbo frequency based at least in part on whether a frequency transition would be performed if the multicore processor were in operation at the N-core turbo frequency, the turbo demotion table including a plurality of entries each associated with an N-core turbo frequency and to store a counter value corresponding to a potential number of frequency transitions during an evaluation interval; and
a dynamic random access memory (DRAM) coupled to the multicore processor.

16. The system of claim 15, wherein the controller is to update the first entry if the frequency transition would be performed.

17. The system of claim 15, wherein the controller is to maintain and update the turbo demotion table for an evaluation interval having a plurality of power state change events.

18. The system of claim 17, wherein the controller is to access the turbo demotion table after the evaluation interval to identify the entry of the turbo demotion table having a counter field value less than a frequency transition threshold and associated with a highest N-core turbo frequency, and to limit a maximum operating frequency of the multicore processor to the highest N-core turbo frequency.

* * * * *